(12) United States Patent
Clark et al.

(10) Patent No.: US 11,596,260 B2
(45) Date of Patent: Mar. 7, 2023

(54) BEVERAGE DISPENSING AND SWEETENING SYSTEM

(71) Applicant: BUNN-O-MATIC CORPORATION, Chicago, IL (US)

(72) Inventors: Charles H. Clark, Springfield, IL (US); Jason M. Banning, Springfield, IL (US); Todd Anhalt, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 0 days.

(21) Appl. No.: 14/917,909

(22) PCT Filed: Sep. 9, 2014

(86) PCT No.: PCT/US2014/054809
§ 371 (c)(1),
(2) Date: Mar. 9, 2016

(87) PCT Pub. No.: WO2015/035398
PCT Pub. Date: Mar. 12, 2015

(65) Prior Publication Data
US 2016/0220060 A1    Aug. 4, 2016

Related U.S. Application Data

(60) Provisional application No. 61/875,522, filed on Sep. 9, 2013.

(51) Int. Cl.
*A23L 2/60* (2006.01)
*A47J 31/40* (2006.01)
(Continued)

(52) U.S. Cl.
CPC .............. *A47J 31/402* (2013.01); *A23L 2/60* (2013.01); *A47J 31/467* (2013.01); *A47J 31/525* (2018.08);
(Continued)

(58) Field of Classification Search
CPC  A47J 31/40; A47J 31/402; A47J 31/41; A47J 31/46; A47J 31/465; A23L 2/60; B67D 1/00; B67D 1/004
See application file for complete search history.

(56) References Cited

U.S. PATENT DOCUMENTS

| | | | |
|---|---|---|---|
| 8,069,883 | B2 | 12/2011 | Shiraishi |
| 2002/0130137 | A1 | 9/2002 | Greenwald et al. |

(Continued)

FOREIGN PATENT DOCUMENTS

| | | |
|---|---|---|
| CN | 102028412 | 4/2011 |
| JP | 2007261621 | 10/2007 |

OTHER PUBLICATIONS

"Homemade Coffee Creamer Recipes." Jan. 24, 2011. <http://uncledutchfarms.com/2011/01/homemade-coffee-creamer-recipes/>. Accessed Jul. 31, 2019. (Year: 2011).*

*Primary Examiner* — Ericson M Lachica
(74) *Attorney, Agent, or Firm* — Barnes & Thornburg LLP (57) ABSTRACT

A beverage making apparatus including at least a beverage producing portion, a controllable by-pass water system, and at least one of a sweetener system or flavoring system in which the sweetener system and/or flavoring system controllably mixes a sweetener ingredient and/or flavoring ingredient with water external to the housing without mixing in a confined structure. A method for producing a beverage is provided including at least the steps of: providing a beverage making apparatus; providing a water dispensing system; providing at least one of a sweetener dispensing (Continued)

system and flavoring system; and controllably dispensing water and at least one of sweetener and flavoring externally of the apparatus for combination with beverage produced by the beverage making apparatus.

3 Claims, 11 Drawing Sheets (51) Int. Cl.
*B67D 1/00* (2006.01)
*A47J 31/46* (2006.01)
*A47J 31/52* (2006.01)

(52) U.S. Cl.
CPC .......... *A47J 31/5253* (2018.08); *B67D 1/004* (2013.01); *A23V 2002/00* (2013.01)

(56) References Cited

U.S. PATENT DOCUMENTS

| | | | |
|---|---|---|---|
| 2005/0127098 A1* | 6/2005 | Bertone | A47J 31/41 222/129.1 |
| 2005/0188854 A1 | 9/2005 | Green et al. | |
| 2006/0115572 A1* | 6/2006 | Guerrero | A47J 31/402 426/597 |
| 2007/0114244 A1 | 5/2007 | Gatipon et al. | |
| 2007/0175337 A1* | 8/2007 | Fedorchak | A47J 31/401 99/279 |
| 2008/0277019 A1 | 11/2008 | Somerby | |
| 2009/0214742 A1* | 8/2009 | Peden | A47J 31/402 426/590 |
| 2010/0314410 A1 | 12/2010 | Nevarez et al. | |
| 2012/0298258 A1* | 11/2012 | Rithener | A47J 31/402 141/285 |

* cited by examiner

BEVERAGE DISPENSING AND SWEETENING SYSTEM

CROSS REFERENCE TO RELATED APPLICATIONS

This application is a U.S. nationalization under 35 U.S.C. § 371 of International Application No. PCT/US2014/054809, filed Sep. 9, 2014, which claims the benefit of priority under 35 U.S.C. § 119(e) to U.S. Provisional Patent Application No. 61/875,522, Sep. 9, 2013. The disclosures set forth in the referenced applications are incorporated herein by reference in their entireties.

BACKGROUND

A beverage making apparatus including at least a beverage producing portion, a controllable by-pass water system, and at least one of a sweetener system or flavoring system in which the sweetener system and/or flavoring system controllably mixes a sweetener ingredient and/or flavoring ingredient with water external to the housing without mixing in a confined structure. A method for producing a beverage is provided including at least the steps of: providing a beverage making apparatus; providing a water dispensing system; providing at least one of a sweetener dispensing system or flavoring system; and controllably dispensing water and at least one of sweetener or flavoring externally of the apparatus for combination with beverage produced by the beverage making apparatus.

A variety of beverage systems have been developed to produce a beverage or a beverage concentrate from a beverage brewing substance. Heated water or other liquids can be combined with a beverage brewing substance such as coffee, tea, or other substances to infuse or otherwise extract characteristics of the beverage making substance to produce a beverage. Some consumers may prefer the addition of a flavoring such as a sweetener combined with the beverage to produce a sweetened beverage such as sweet tea. Disclosed is a beverage making apparatus, beverage ingredient adding or sweetening assembly, a system combining these items and the methods associated with them.

By way of review, a beverage making substance can be used to produce a beverage by combining such a beverage making substance with an infusing liquid such as water. The combination of the beverage making substance and liquid produces a beverage which is dispensed into a container. For convenience in the present application the beverage making substance will be referred to as "tea" and the liquid will be referred to as "water". It should be appreciated that these terms are provided as a convenience in describing the general structures and functions of the present disclosure and are provided by way of illustration and not limitation. Moreover, the form of the beverage making substance and the type of liquid as well as the temperature of the liquid should not be limiting. The beverage making substance could be any form of liquid, powder, fresh ground coffee or other substances as noted below. Additionally, the temperature of the water could be heated, ambient, chilled or any combination of these temperatures as might be needed for a particular beverage producing process.

One example of a prior art beverage system which includes sweetening is "sweet tea". Sweet tea is a favorite among many people and has been incorporated into a variety of menus. One way of producing "sweet tea" is to produce a fresh brewed tea beverage and then add a sweetening component to the beverage. In one embodiment of the prior art a tea concentrate is brewed and diluted during the brewing process. The tea brewing process is controlled so as to produce a tea having desirable characteristics such as flavor, temperature, clarity, as well as other characteristics.

A variety of flavorings such as sweeteners may be used to sweeten the tea. Sweeteners may be natural such as cane derived sugar, other sugar derived from other substances, artificial sweeteners such as, but not limited to, aspartame, phenylalanine, and *stevia*. Examples of these sweeteners are provided as illustrations and not limitations. Any form of sweetener could be used which are currently available or to be developed in the future.

One method the prior art used for producing a sweetener and adding it to the ice tea is to dissolve cane derived sugar crystals in water. The water becomes relatively saturated with the sugar material and forms a liquid sweetener. The liquid sweetener can then be combined with the tea to produce a sweetened tea beverage. A variety of recipes can be developed depending on personal, regional, or other tastes or factors.

One of the complications with traditional sweet tea production is the ability to control a tea and sweetener recipe to achieve a consistent product from batch to batch. Also, one of the limitations is the ability to develop recipes and controllably, reliably, and repeatedly produce the recipes. As such, it would be desirable to provide a tea producing and sweetening apparatus and method in which satisfies these requirements.

Another issue that arises with the production of beverages, in general, is the need to maintain production controls and sanitation. The production of food substances requires sanitation methods to maintain high quality food products which try to reduce and/or prevent the development of undesirable results such as contamination, reduced shelf life, cross flavoring, and/or contact with unsanitary or less sanitary structures which might otherwise reduce the consistency, thoroughness, or reliability of a cleaning protocol. In this regard, some devices which combine a beverage substance with water may include places where microbes can be harbored. As such, it is one of the objectives of the present application to reduce and/or prevent potential sanitation issues.

This background information is provided to provide some information believed by the applicant to be of possible relevance to the present disclosure. No admission is intended, nor is such an admission to be inferred or construed, that any of the preceding information constitutes prior art against the present disclosure. Other aims, objects, advantages and features of the disclosure will become more apparent upon reading of the following non-restrictive description of specific embodiments thereof, given by way of example only with reference to the accompanying drawings.

BRIEF DESCRIPTION OF THE DRAWINGS

The present disclosure will be described hereafter with reference to the attached drawings which are given as a non-limiting example only, in which:

FIGS. 10A-10F provides a series of diagrammatic illustrations of versions of timing diagrams, similar to that as shown in FIG. 4, showing timing of ingredients being dispensed by the brewing apparatus of the present disclosure for a sample recipe provided as an illustration and not as a limitation, the timing diagrams showing dispensing of water for brewing, water for dilution and/or by-pass, and combination with sweetener, and any other ingredients may be added to any or all of these time lines, with FIG. 10A showing a generally concurrent flow of the various ingredients.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Figure 1:
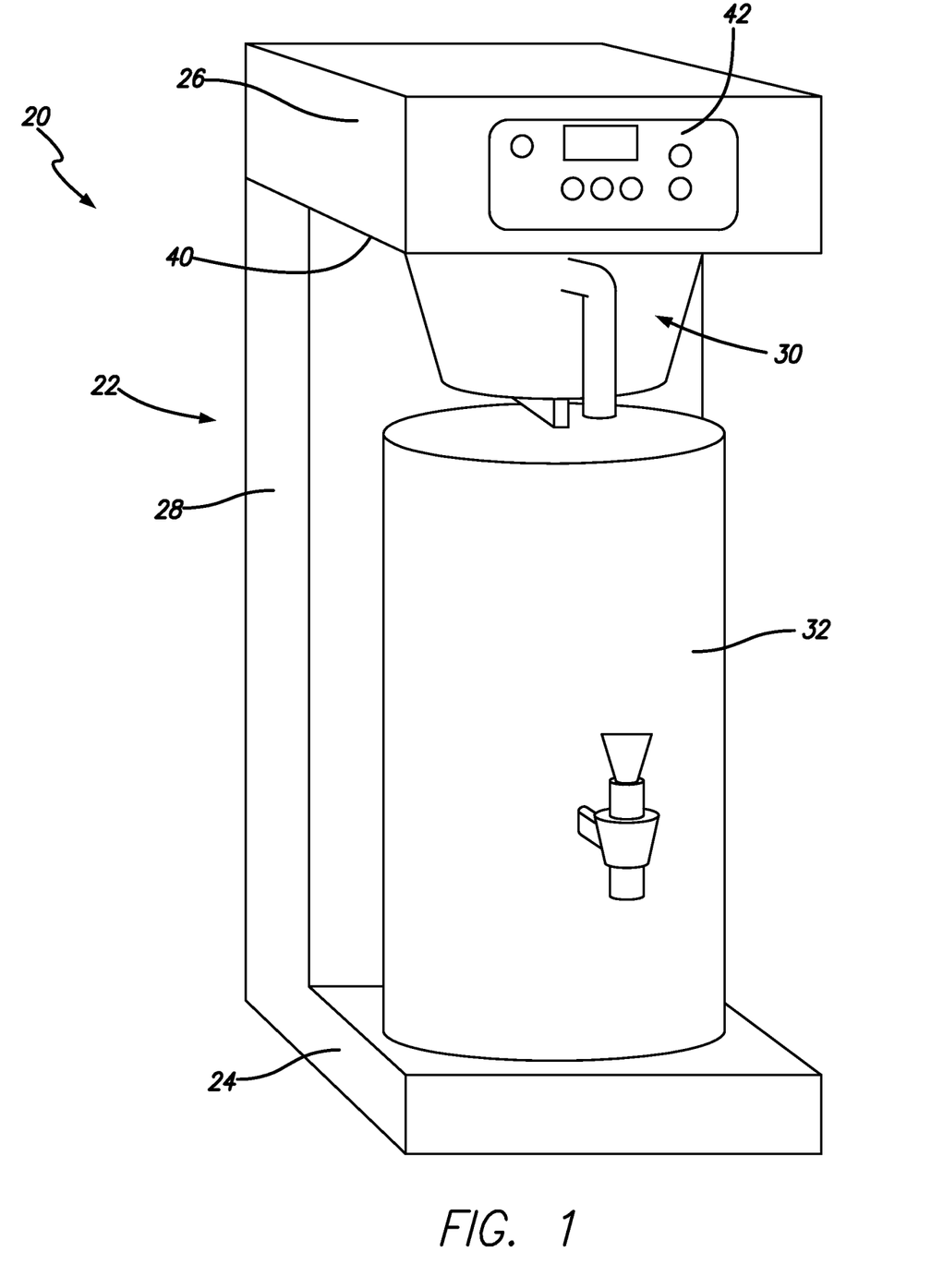
FIG. 1 is a perspective view of a beverage producing device such as a tea brewer which includes a housing, a funnel for retaining a beverage making substance such as fresh tea, and a container for receiving the freshly brewed tea.

With reference to FIG. 1, a beverage brewing apparatus 20 is illustrated. The apparatus include a housing 22 having a base 24 and a hood 26. The hood 26 extends from a trunk portion 28 and a beverage brewing substance holder 30 is positioned underneath the hood. The beverage substance holder 30 can be in the form of a funnel which retains a filter structure 31 therein for retaining brewing substance 34 in the filter structure 31. Although a detail of this filter assembly is not illustrated in the drawings or this description, such assemblies are well known in the art and are incorporated herein by reference in the entirety. A dispenser 32 is positioned below the hood 26 and funnel 30 for receiving brewed beverage therefrom.

Figure 2:
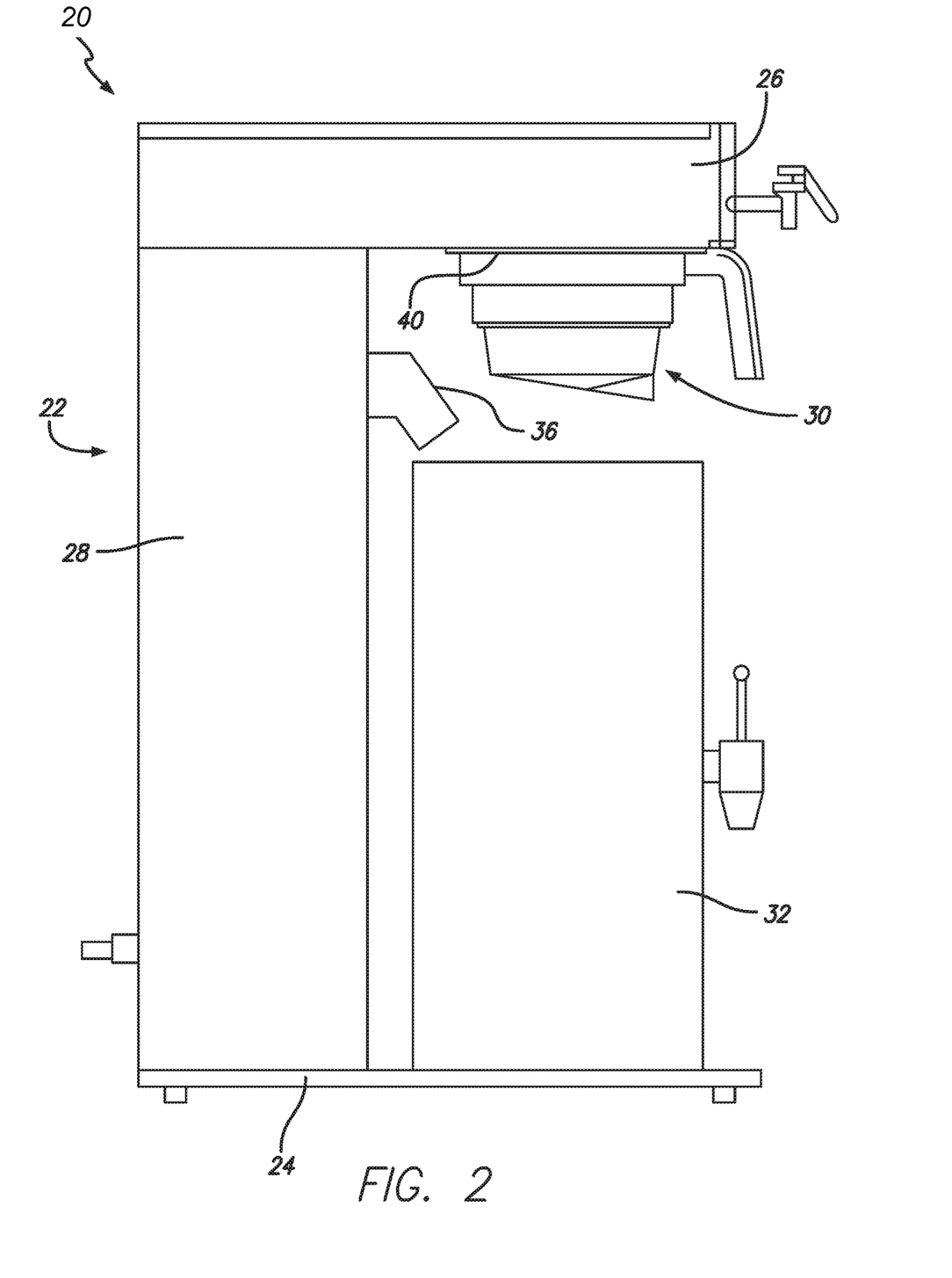
FIG. 2 is a side elevational view of the beverage producing device as shown in FIG. 1 which also shows a dispensing head associated with an ingredient adding or sweetening assembly which produces controllably dispensed stream of liquid and liquid sweetener for mixing external to the housing and possibly at least partial mixing prior to contact with the tea retained in the dispenser.
Figure 3:
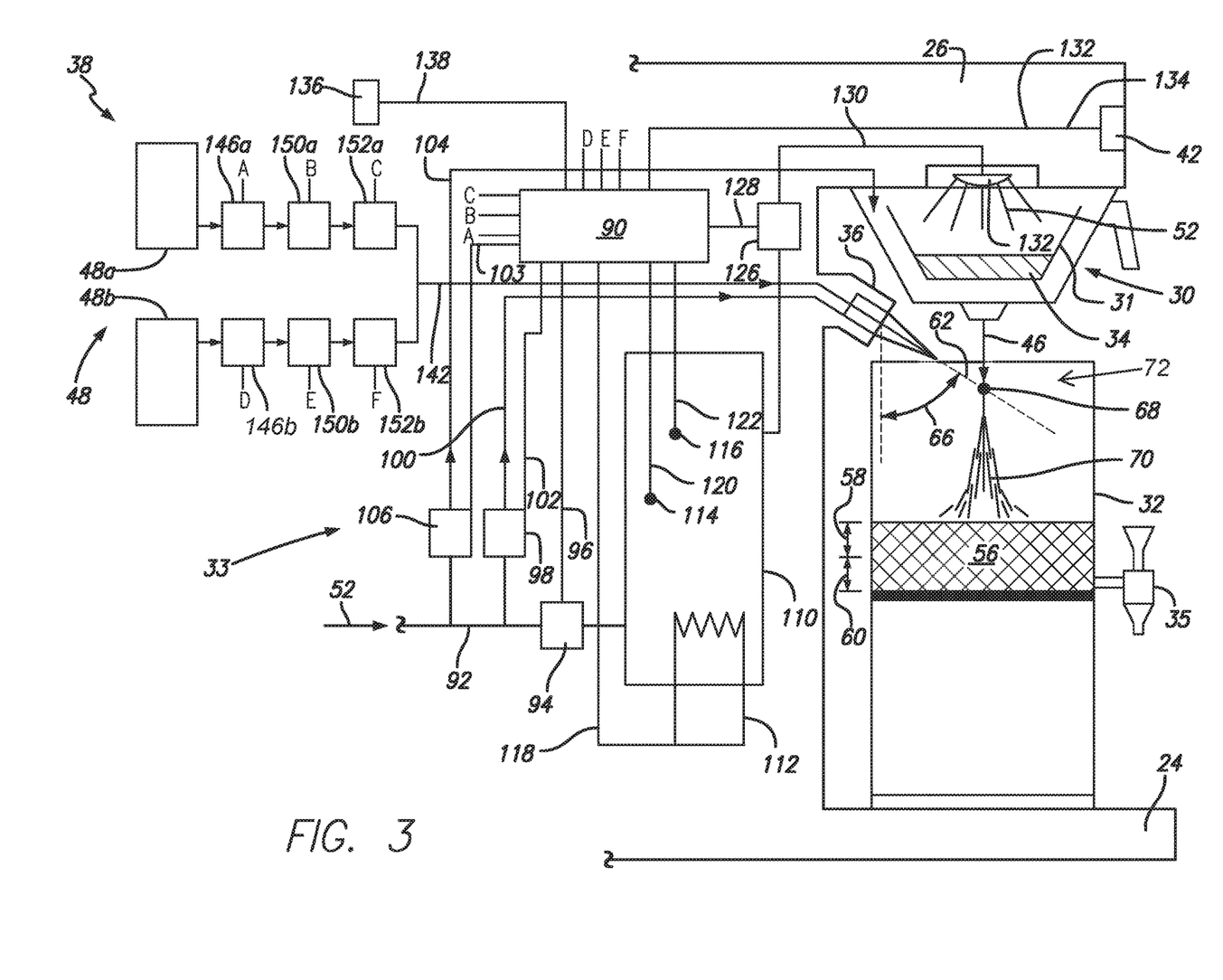
FIG. 3 is a diagrammatic illustration of a system for producing a brewed tea beverage and combining the brewed tea beverage with a sweetening product and controllably dispensing the freshly brewed tea product to controllably produce a sweetened tea product having desirable characteristics which can be repeatedly produced in accordance with a preselected recipe.

The brewing apparatus 20 is shown in a side elevational view of FIG. 2 further illustrating a dispensing portion 36 of an ingredient delivery assembly 38 (see FIG. 3). In use, an operator places brewing substance 34 in the holder or funnel 30 and positions the funnel below the hood 26. Structures are provided such as rails 40 to retain the funnel in position during a brewing cycle. A control panel 42 is provided on the apparatus 20 for controlling the brewing cycles. During a brewing cycle water is dispensed from a water delivery system 33 in the apparatus 20. The controllably dispensed water enters the funnel 30 for mixing with the brewing substance to produce a brewed beverage 46. Brewed beverage 46 is then dispensed from the funnel into the dispenser 32 for collection therein and controllable dispensing though a faucet 35 on demand. As will be described in greater detail below with regard to the description of the dispensing assembly 36, one or a combination of sweetening ingredients 48 can be controllably dispensed from the ingredient delivery assembly 38, shown and described in this embodiment by way of illustration and not limitation as only a sweetening assembly. Furthermore, more than one ingredient of a variety of available ingredients may be added in the manner of the present disclosure. Water 52 is controllably dispensed through the system and can be controllably combined with the sweetening ingredient 48. All of the ingredients are dispensed into the dispenser 32 for subsequent dispensing.

Terms including beverage, brewed, brewing, brewing substance, brewed liquid, and brewed beverage as may be used herein are intended to be broadly defined as including, but not limited to, the brewing of coffee, tea, and any other beverages. This broad interpretation is also intended to include, but is not limited to any process of dispensing, infusing, steeping, reconstituting, diluting, dissolving, saturating, or passing a liquid around, by-passing, passing liquid through, or otherwise mixing or combining a beverage substance with a liquid such as water without limitation to the temperature of such liquid unless specified. This broad interpretation is also intended to including, but is not limited to beverage substances such as ground coffee, tea, liquid beverage concentrate, powdered beverage concentrate, flaked, granular, freeze dried or other forms of materials including liquid, gel, crystal or other forms of beverage or other food materials to obtain a desired beverage or other food product.

Moreover, while "beverage" is referred to, it is envisioned that any variety of food ingredients could be placed in an ingredient container to produce a desired food. In this regard, the food could take the form of juice, coffee, tea, other flavored beverages, as well as other foods, soups, breakfast cereals, etc. Furthermore, use of an infusing and/or dilution ingredient is to be broadly interpreted. While "water" is referred to for convenience throughout the application it should be understood that any variety of ingredients could be used with the present application.

One embodiment and application of the brewing apparatus 20 and sweetening assembly 38 may be used to produce a beverage known as "sweet tea". Sweet tea may be produced using a fresh brewing substance such as tea in combination with heated water to produce a fresh brewed tea beverage. The tea beverage is sweetened with a sugar substance. It should be noted that other substances may be used in the brewing process as noted above as well as a variety of sweetening or flavoring substances with or without sweetener may be used. This system can accommodate a variety of beverages, sweeteners, flavoring substances and other ingredients which might be combined to produce a beverage. One of the preferences in producing such a sweet tea is to produce a finished beverage which is uniformly mixed, integrated, or otherwise combined with all of the ingredients uniformly throughout the resultant beverage. Referring to an example of a sweet tea beverage, it is desirable to provide a sweet tea beverage which is consistently sweetened throughout the entire beverage batch 56 retained in the dispenser 32. In other words, from the upper portion 58 of the batch 56 through the lower portion 60 of the batch 56 a generally consistent brix is measured the same from the upper portion 58 all the way through the beverage to the lower portion 60. Additionally, it may be desirable to produce a beverage such that the beverage does not separate or form striations of different flavors or sweetness levels (brix) throughout the batch.

The present disclosure includes descriptions of structures, methods and systems which overcome potential problems with beverage production and mixing of ingredients. One of the ways in which the present system produces a finished beverage or batch 56 is by controllably mixing sweetener 48 with the brewed tea 46 dispensed from the brewing apparatus 20. The method of producing such a sweet tea beverage is to initiate a brewing cycle whereby water 52 is dispensed into the funnel 30 to combine with the brewing substance 34 retained in a filter structure 31. During a brewing cycle the brewed beverage 46 will be dispensed into the dispenser 32.

The method of producing such a desired sweet tea beverage times the production of beverage with the mixing of sweetener 48. A sweetener stream 62 is diagrammatically illustrated in FIG. 3 and shown to be combined with the tea beverage 46. The timing of the dispensing of the sweetener (either combined with water or not combined with water) is timed to run during the entire brewing cycle. As such, once tea starts to dispense from the funnel 46 sweetener generally will be dispensed throughout the entire brewing cycle. This method requires the development of a recipe related to the timing of the brewing cycle for producing the brewed substance 46 and allocating the desired volume of sweetener 48 over the entire brewing cycle time period general method or recipe is applicable to large batches, small batches, flavoring and beverages of every sort.

Additionally, if by-pass water is required to be combined with the brewed beverage the by-pass water can be combined with the sweetener to produce a dose or predetermined volume of sweetener over the entire brewing cycle. By-pass water may be included in the recipe to dilute a relatively strong tea beverage, which is typical for iced tea preparation.

In one embodiment, the dispensing of sweetener 48 and/or water 52 from the dispensing portion 36 may be directed at an angle 66 to generally impinge or intersect 68 the beverage stream 46. While this intersection is not required for mixing of the ingredients, one embodiment may be configured to provide this function. The intersection 68 of the ingredients while being dispensed helps to initiate the combination of ingredients as soon as possible upon dispensing from the apparatus 20 into the dispenser 32. The combined cascade 70 of ingredients flows into the batch 56 in a cavity 72 of the dispenser 32. The ingredients continue to mix as a result of the continued flow and turbulence of the fluids and ingredients over the entire brewing cycle. Even if intersecting streams is not achieved, the flow of sweetener and dilution liquid may cause a stiffing effect on the volume of beverage in the dispenser to facilitate mixing performance or thoroughness of mixing. The combination of these recipe or timing requirements during the brewing cycle along with the mechanical mixing of the ingredients helps to assure a thorough combination of ingredients to produce generally consistent brix measurements from the upper proportion 58 down to the lower portion 60 of the entire batch 56.

Figure 4:
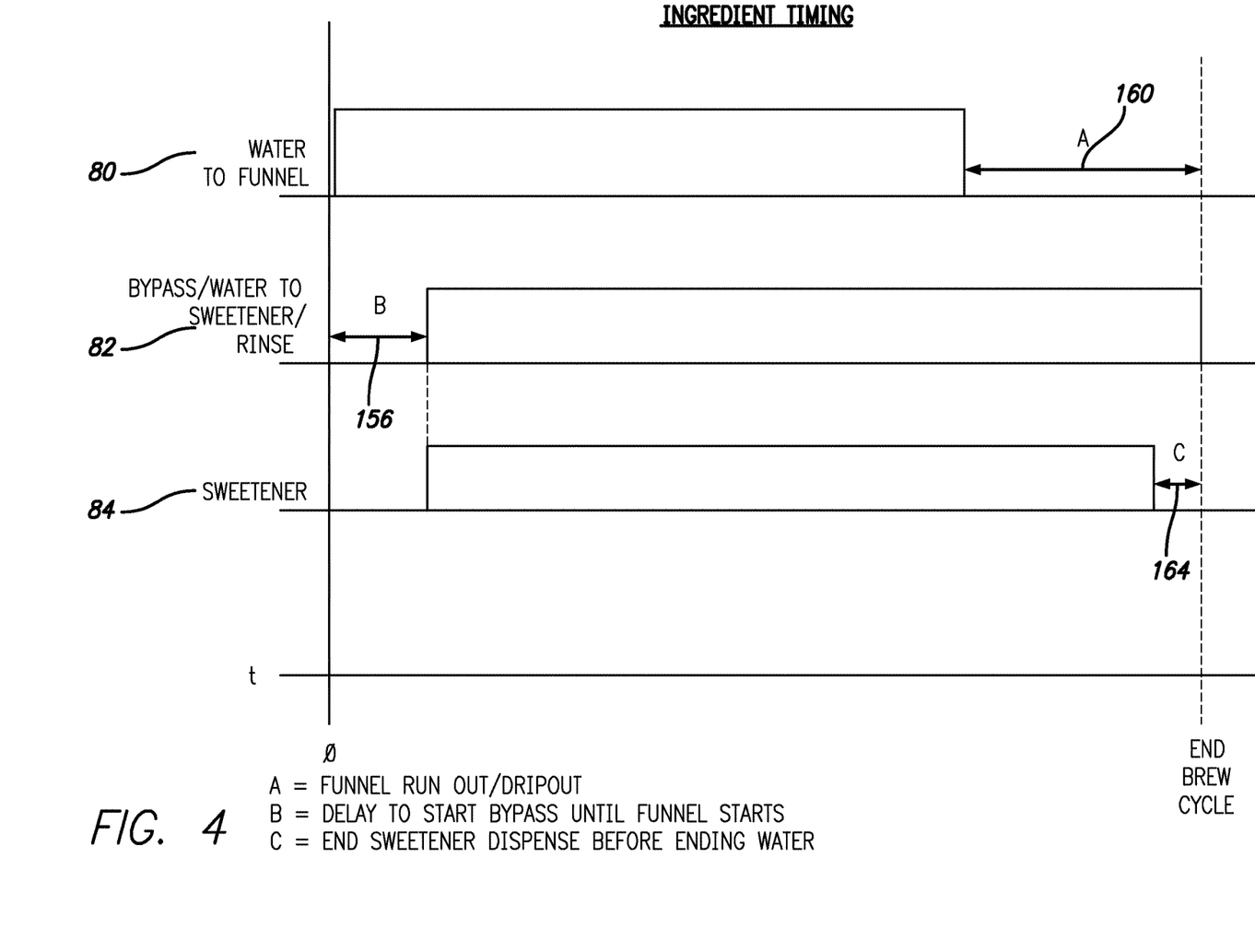
FIG. 4 is a diagrammatic illustration of one version of a timing diagram showing timing of ingredients being dispensed by the brewing apparatus of the present disclosure for a sample recipe provided as an illustration and not as a limitation, the timing diagram showing dispensing of water for brewing, water for dilution and/or by-pass, and combination with sweetener, and any other ingredients may be added to this timeline.
Figure 5:
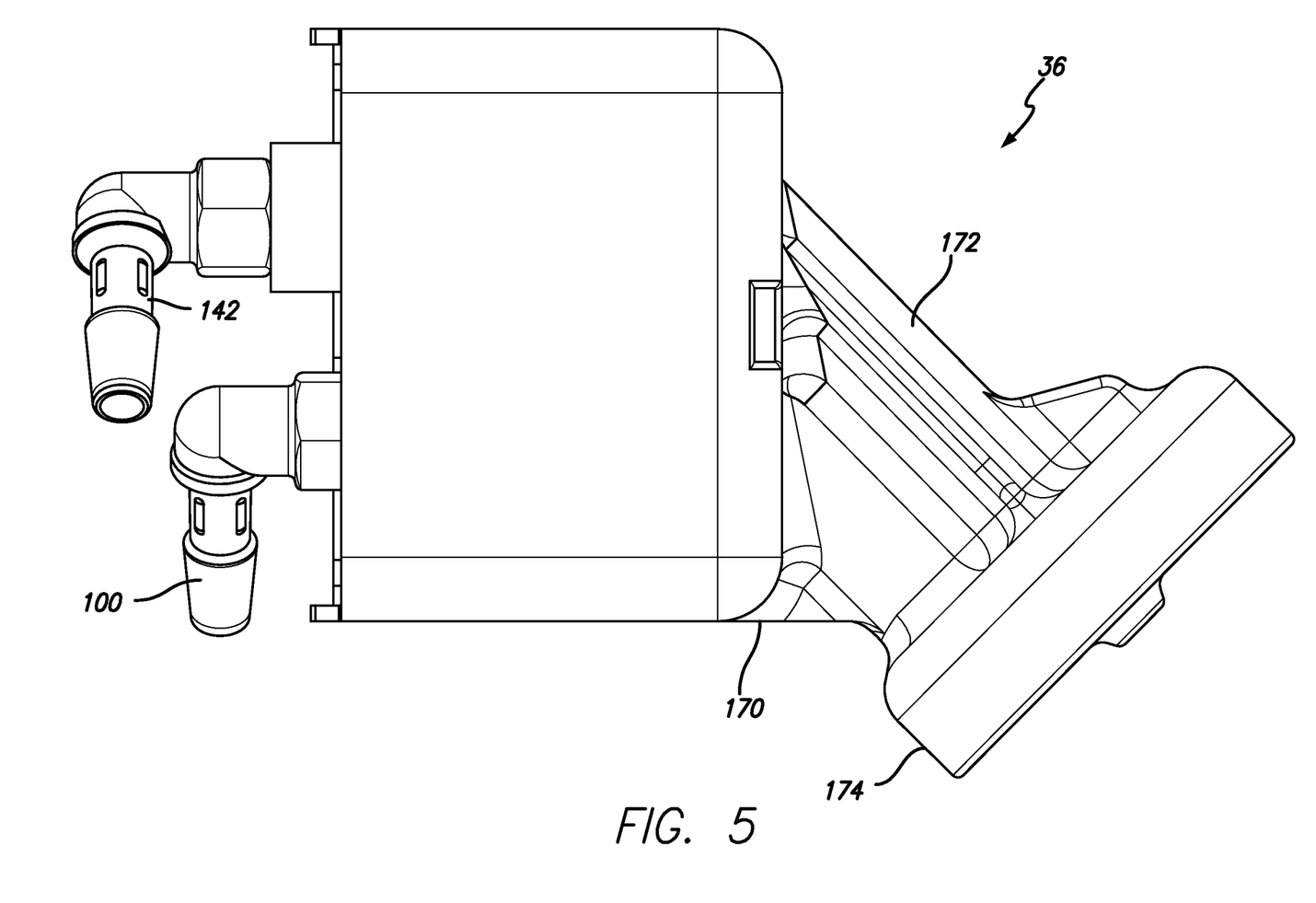
FIG. 5 is a side elevational view of a dispensing head portion of the sweetening assembly showing a body portion with a neck and head portion extending therefrom.

To help illustrate the method and/or recipe as described above reference is made to FIG. 4. As shown in the representative or sample recipe of FIG. 4, a timing diagram illustrates the relative timing of the dispensing of water to a brewing funnel 80, the dispensing of water for use as bypass water and when applicable combinations with sweetener or other flavorings 82, and the dispensing of sweetener or other ingredients 84. The origin of the timing diagram represents the activation or initiation of a brewing cycle 86. Further description of the timing diagram will be provided in conjunction with further detailed description of the system diagram of FIG. 3. FIG. 4 provides a representative recipe, but the timing/rate of beverage brewing, dilution water flow, sweetener/flavor delivery, may be variably controlled to achieve customer desired results for mixing, flavor, and serving/brew times. Each beverage product and customer preferences for the variety of beverage products may be different, as well as possibly adjusting the recipes to accommodate regional or national differences. The timing may be adjusted to accommodate these and other differences. However, the timing using this invention may be changed and recorded for reuse in the apparatus and may be used for many copies of the apparatus to provide consistency and repeatability across numerous server locations as well as among multiple apparatus at the same location.

Briefly, with reference to FIG. 3, the system diagram shows the various components used in the preparation and dispensing of beverage. The system includes a controller 90 which is coupled to various components to receive information or provide control signals. As an example, the inlet water line 92 includes an inlet valve 94. The inlet control valve is coupled to the controller by line 96. Additional inlet control valves 98 coupled to the dispense portion 36 using water line 100 and coupled to the controller by line 102. An alternate by-pass line 104 includes an inlet control valve 106 coupled to the controller 90 by line 103. The inlet water line 92 is coupled to a heated water reservoir 110. The heated water reservoir 110 includes a heating device 112, a temperature sensor 114, and a level sensor 116. These devices are coupled to the controller 90 over lines 118, 120, and 122, respectively. An outlet control valve 126 coupled to the controller 90 by line 128 controllably dispenses a measured volume of water from the reservoir 110 to the funnel 30. Water dispensing line 130 communicating with the hot water reservoir 110 and a spray head 132 provides a path to dispense water to the brewing substance 34 in the funnel 30. The control panel 42 and/ or other control devices are coupled to the controller 90 by line 134. An alternate input or control device 136 is carried on the housing and coupled to the controller 90 by line 138.

The sweetening assembly 38 includes the dispense portion 36 as initially described herein and includes the water dispensing portion including the control valve 98 and dispensing line 100 to deliver water to the dispensing portion 36. A sweetener dispensing subassembly 140 communicates to the dispensing portion 36 over sweetener line 142. The sweetener line 142 and water line 100 both pass through at the dispensing portion 36 as will be described detail below. The dispensing portion allows for the combination of these ingredients in the dispensing path 62 for combination with the brewed beverage 46 as described above.

The sweetener subassembly 140 includes a volume of flavoring ingredient or sweetener 48a, 48b. While a pair of sweetener sources 48a, 48b is provided a single source may be used as well as additional sources. Each sweetener source 48a, 48b includes control elements to controllably dispense a measured volume of sweetener. The control elements include a first sweetener pump 146a and a second sweetener pump 146b; a first detect switch 150a and a second detect switch 150b; and a first sweetener valve 152a and a second sweetener valve 152b. Each of these elements is connected to the controller 90 as illustrated in the diagram.

Each of the sweetener sources 48a, 48b include a series of elements so it can provide redundancy. It would be undesirable to run out of one of the sources during a beverage production cycle. As such, during a dispensing cycle if the sweetener 48a is being pumped (146a) and the detect switch 150a detects that the source 48a is out of sweetener, that signal will be communicated to the controller 90 and the valve 152a will be closed by the controller 90. The controller 90 detects and controls this operation. Simultaneously with this event the controller 90 will initiate operation of the second pump 146b and receive a signal from the detect switch 150b while opening the control valve 152b to allow sweetener to flow from the source 48b to the sweetener line 142. This redundancy helps prevent any interruption of sweetener flow from the system.

The flow rate of the ingredient 48a, 48b may change due to the product viscosity, temperature, bag-in-box ("BIB") location relative to the brewer, type of pump, pump psi setting, tubing material connecting the ingredient 48 to the dispensing portion 36, as well as other factors. The different flow rates may result in different durations for product delivery, and may ultimately affect the correlation of start/stop of sweetener, compared to the concentrate and dilution/by-pass. However, the system may be configured for all of these variables, ranges of these variables, monitored for changes in the variables, and have recipes designed to accommodate these variables. Also, sensors may be added to monitor these variables or they may be monitored indirectly through electrical load, torque sensing or other means. However, these variables and others may be managed using the present invention to improve the control of the resultant beverage as measured against a predetermined recipe. Some recipes may call for a dilution delay, so that there is not overlap of concentrate dispensing and addition of the dilution water and sweetener. The control software may be programed or otherwise configured to pulse smaller doses of sweetener throughout the duration of the dilution/by-pass deliver. Alternatively, another version, depending on the recipe may run the sweetener steady without pulsing throughout the entire period during which the dilution is dispensed. The ratio of dilution/ by-pass may also be determined and controlled depending on the recipe parameters. For example, if the recipe has a low volume of dilution to be added, but a high volume of sweetener, the dilution might start after the start of the sweetener dispensing.

Some of the settings that may help to reduce stratification include: dilution delay, the flow rate of the sweetener, and the timing for the start of the dilution relative to the start of the sweetener dispensing. Some initial delay of dilution may help in the mixing and prevent the first cup or couple of cups dispensed from having too high of a brix measurement. The metering orifice may be sized to achieve a similar "time on" to the dilution rate used in the recipe. In the event the dilution runs a bit longer than the sweetener, the software controlling the system may cause the dilution to finish first to reduce the possibility that the top brix reading is not diluted.

With further reference to the timing diagram as shown in FIG. 4, during a brewing cycle the control valve 94 is opened to allow water 52 to flow through the water line 92 to the heated water reservoir 110. The brewing system operates, in the illustrated embodiment using a displacement water system. In other words, once water flows into the heated water reservoir 110 the control valve 126 is open to allow heated water at the upper portion of the reservoir to flow out of the reservoir into the spray head 134. During a typical brewing cycle the flow of beverage 46 does not start at the same time as flow of water into the funnel. Rather, the water must first saturate the brewing substance 34 to infuse it and produce a brewed beverage.

A delay 156 is provided before by-pass water is allowed to flow from the dispensing portion 36. The system is timed to start the flow of by-pass water and sweetener shortly after the flow of tea 46 from the brewer. This helps to extend the dose of sweetener and water which is combined with the tea over the entire brewing cycle. Similarly, a funnel run out or drip out 160 is provided by turning off the water to the funnel and allowing the continued flow of beverage 46 from the funnel while simultaneously providing by-pass water and/or sweetener.

The sweetener timing line 84 shows that sweetener is activated shortly after the flow of water to the funnel and generally at about the same time 156 or delay as the by-pass water. The sweetener dose required for the particular recipe is timed to flow over the entire brewing cycle. However, the sweetener can be stopped 164 shortly before stopping the by-pass water. Alternatively, this timing differential 164 can be eliminated and sweetener can be dispensed throughout the entire water dispensing cycle. For general uniformity of mixing sweetener and dilution (by-pass) will flow at the same time using this mixing nozzle. However, sweetener may start earlier, run later, or be turned off or on at any point during the brewing cycle if such a flow is decided to be used by the operator, recipe, or some other selective decision. For example, the choice of recipe and, perhaps, the ingredients, may dictate the timing of the sweetener flow. Or, the composition of the sweetener and its mixing, physical, or chemical characteristics may suggest using a particular timing. As an example by way of illustration and not limitation, some sweeteners may react differently with different beverage making substances. As a result the resultant beverage could become cloudy unless a particular mixing timing, temperature, dilution strength of the beverage or other characteristics are controlled. Under such circumstances, the sweetener timing may be selectively controlled to reduce or eliminate such clouding.

In use, the apparatus 20 includes systems, methods, and assemblies for producing a brewed beverage 46 and combining the brewed beverage with a stream of water and/or sweetener 62 which is controllably dispensed by the controller 90. An operator operating the system initiates operation of the system at the control panel 42 connected to the controller 90. Beverage and sweetener are controllably dispensed over the brewing cycle so as to help produce improved brix control of the resultant beverage or batch 56. The consistency of the brix of the batch of beverage is an effective way to gage the mixing efficiency of the sweetener in the finished batch of sweet tea. The present methods prevent stratification of the sweetener from the tea and produce a finished beverage with a narrow range of brix variation. In one embodiment of the present invention the brix variation range throughout the volume of the dispenser is on the order of +/−0.5 brix.

As will be described in detail below, the dispensing 36 provides structures and methods for combining sweetener and water and then using the combined flow external to the housing of the apparatus to deliver the combined flow 62 to intersect 68 the tea flow 46 dispensed from the brewer. The dispensing of water and sweetener external to the housing is useful to enhance the sanitation characteristics of the present system. Mixing of water and sweetener only occur external to the housing during a brewing cycle. When the control mechanisms are stopped the flow of water and sweetener is stopped and the ingredients cannot be combined. Clean up and sanitation can be achieved by merely cleaning surfaces and running sanitation substances through the system based on prescribed protocols. The external mixing of sweetener and water eliminates components which might otherwise need to be independently cleaned and sanitized. Additionally, this eliminates the need to remove parts for such cleaning and sanitizing and the possible resultant loss or damage of such part. The improvement in this mixing system helps to improve the reliability of the system and prevent down time of the system.

Figure 6:
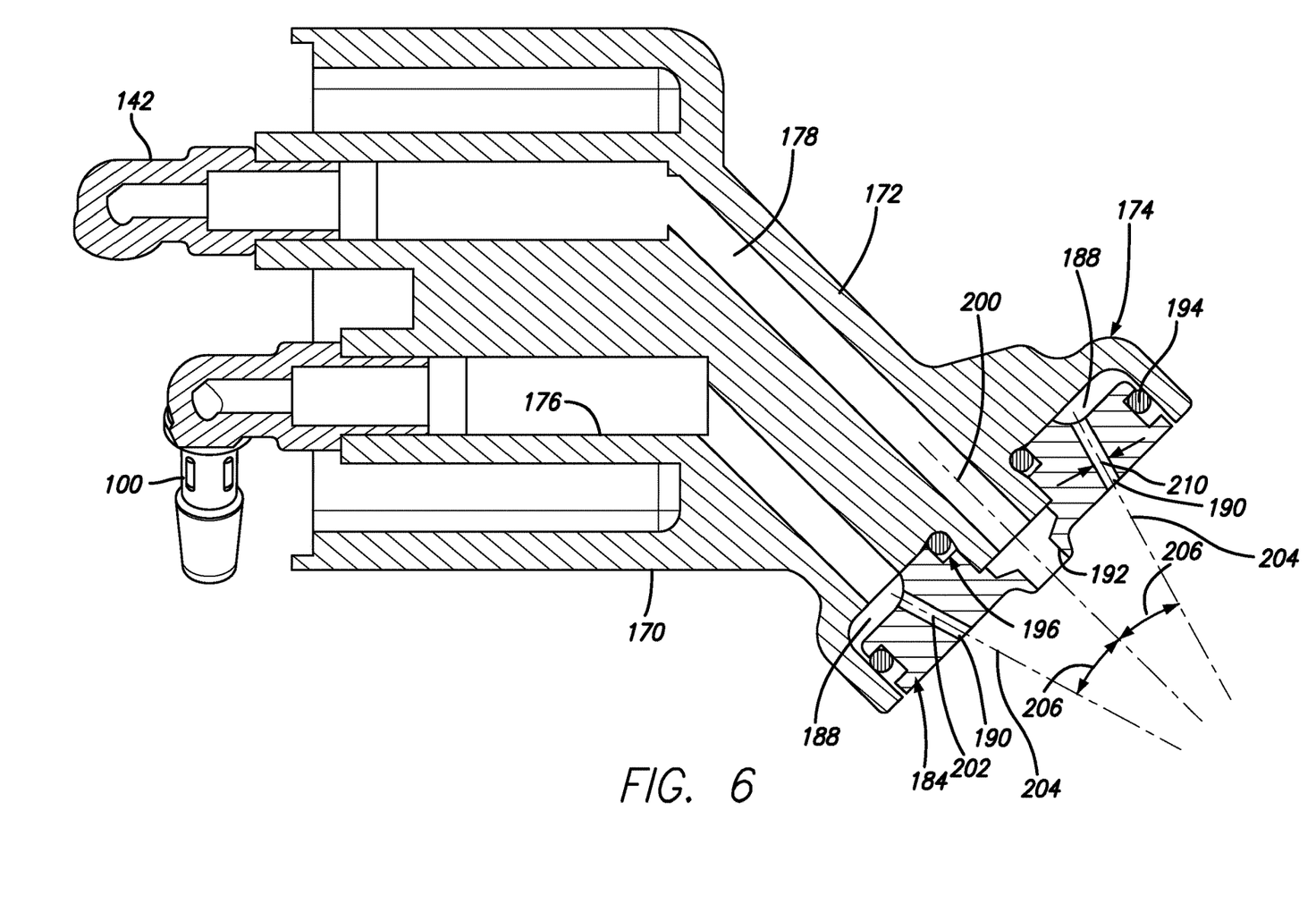
FIG. 6 is a general illustration of a cross section of a dispensing head portion of the sweetening assembly which illustrates the combination of least one path of sweetener being dispensed in a stream and combined with at least one path of water in a controllable manner so as to produce a combined stream which at least initiates the mixing of water and sweetener external of the housing and dispensing head and prior to combination with the tea retained in the dispenser.
Figure 7:
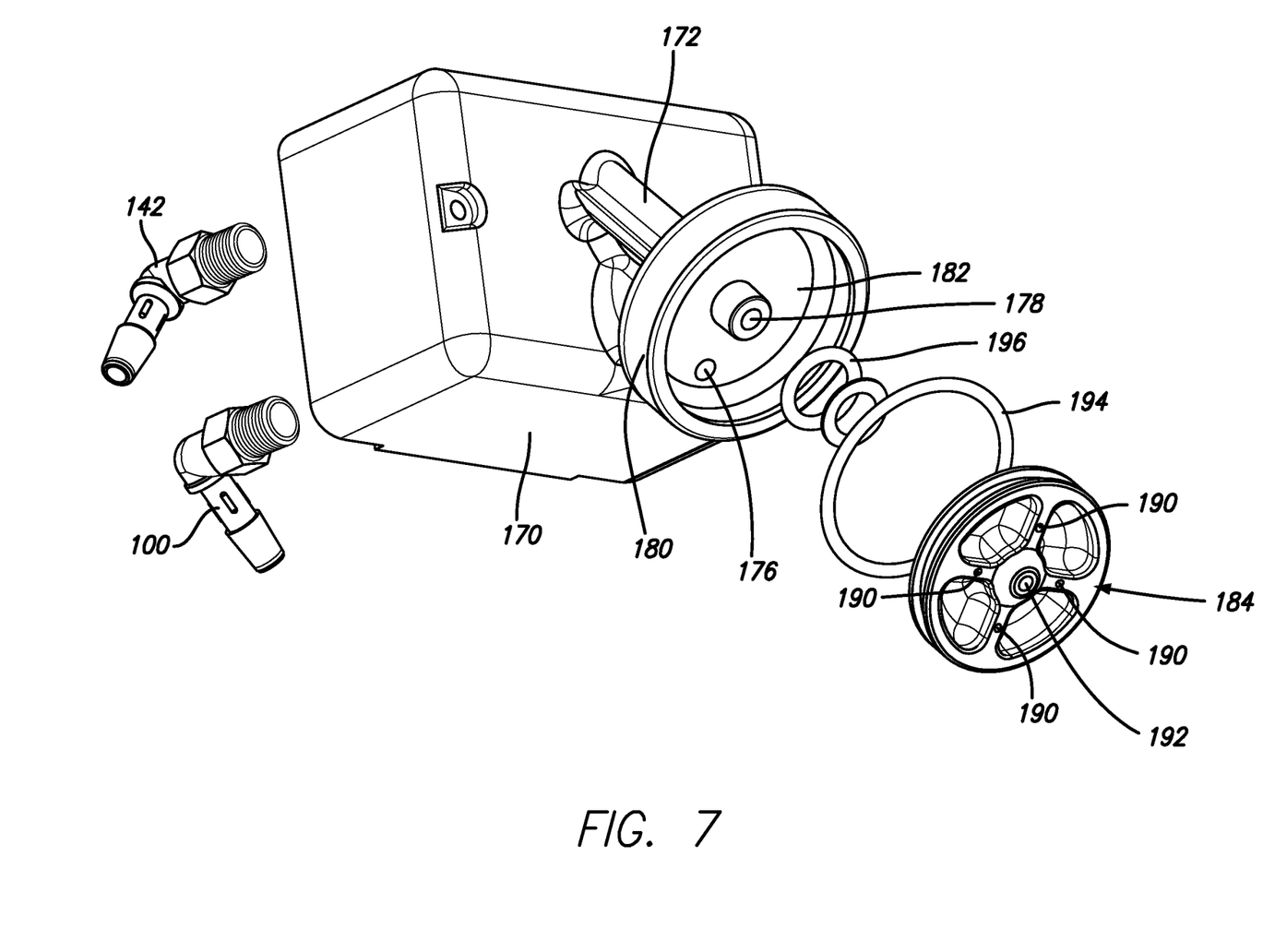
FIG. 7 is an exploded perspective view of the dispensing head portion of the sweetening assembly showing a face portion of the dispense head exploded away from the body portions revealing a water distribution cavity, a pair of o-rings, and internal sweetening passage.
Figure 8:
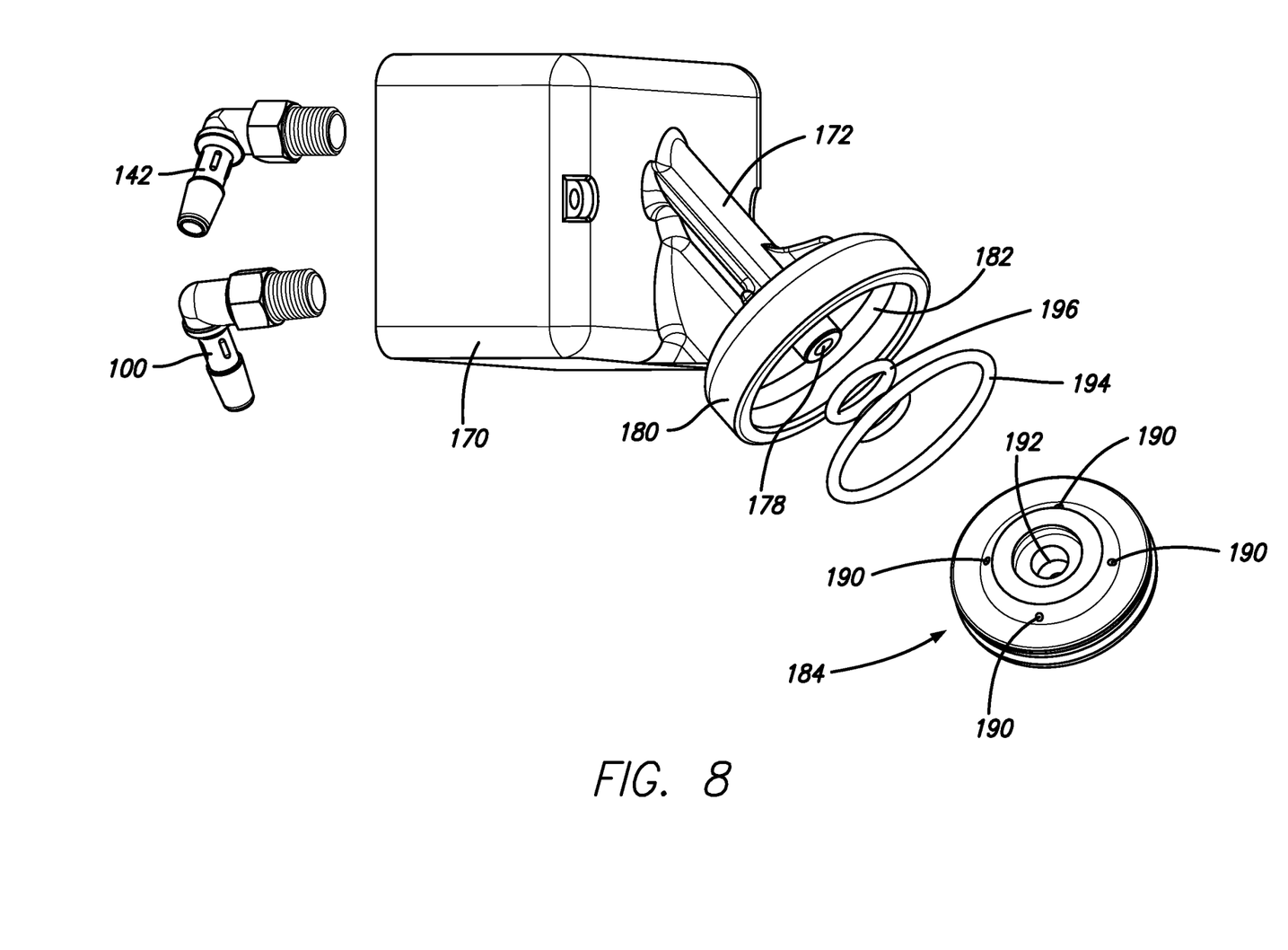
FIG. 8 is a exploded perspective view similar to FIG. 6 in which the face has been rotated.
Figure 9:
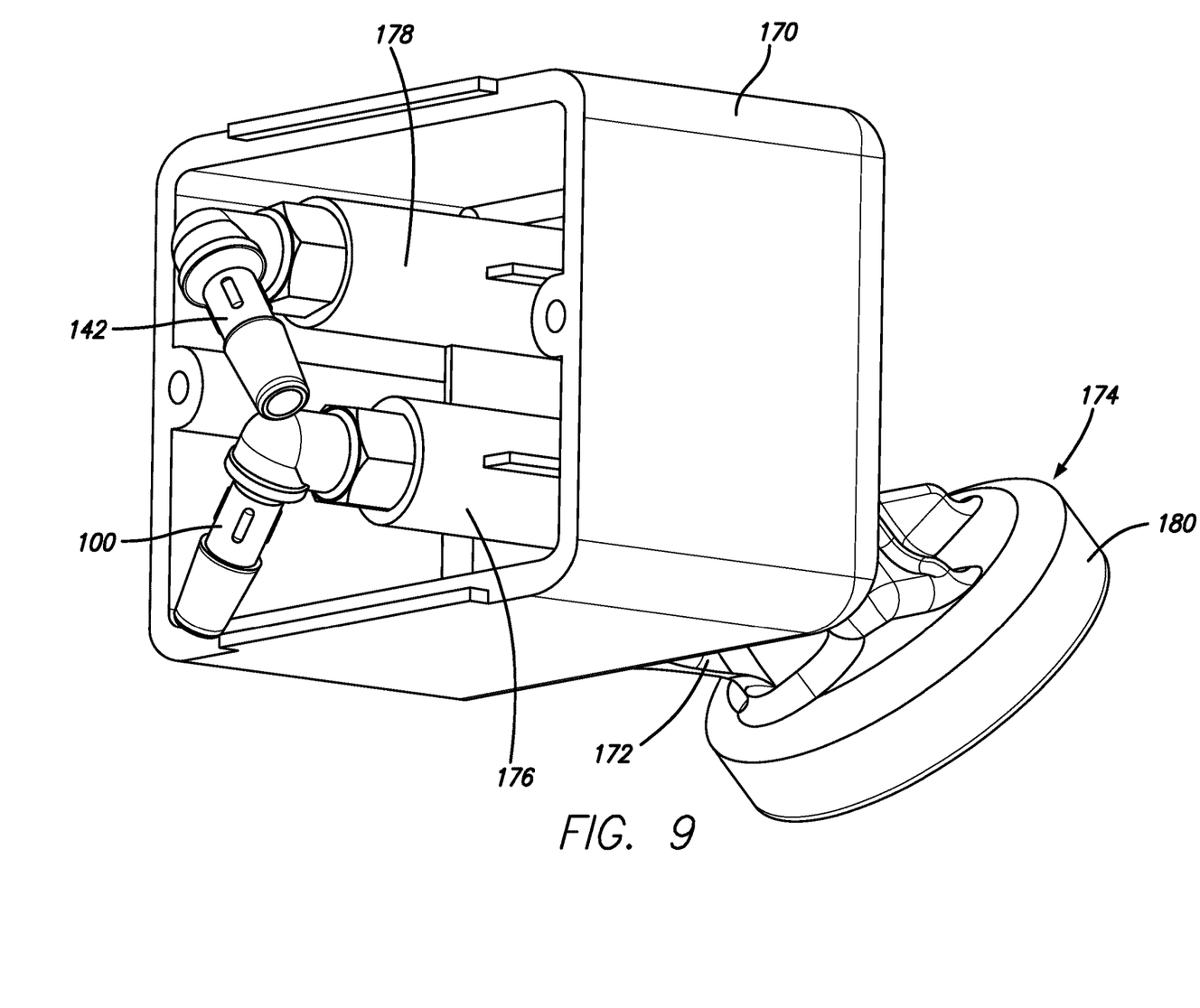
FIG. 9 is a rear perspective view of the dispensing head portion of the sweetening assembly.

Turning to FIGS. 5-9, the dispensing portion 36 is shown in greater detail. The dispensing portion includes a body portion 170 with a neck 172 extending therefrom terminating in a head 174. The water line 100 and sweetener line 142 connect to the dispensing portion 36 for controlled dispensing through passages 176, 178, respectively. As shown, the water passage 176 and sweetener passage 178 are maintained separate throughout the entire dispensing portion 36. This eliminates the potential combination and sanitation issues. With reference to FIG. 8, the head 174 includes a wall 180 which defines a cavity within the head 182. A face portion 184 is retained in the cavity 182. As shown in the cross sectional view of FIG. 6, a flow path 188 is formed between the head 174 and the face 184. The flow path 188 allows the water to be distributed around the head for dispensing through multiple dispensing ports 190. While a single sweetener dispensing port 192 is shown multiple ports could also be configured for the sweetener, as well. A gasket 194 is provided along a perimeter of the face 184 to seal the cavity. A second o-ring 196 provides a seal between the face and the sweetener passage 178.

The sweetener passage 178 is oriented along an axis 200 defining a central axis for the dispensing of ingredients from the dispensing portion 36. Water passages 202 extending through the face 184 provide communication between the water distribution passage 188 and the water port 190. These passages 202 are oriented along a water axis 204. Each water axis 204 is oriented at an angle 206 relative to the central axis 200. In this regard, the water axis directs the water towards the central axis 200 or flow direction of the sweetener. The angle 206 of the water axis 204 can be designed or otherwise controlled to produce a desired water mixing effect with the sweetener. In this regard, multiple water passages 202 or a single water path 202 may be used.

Regardless of the number of water paths used, the path can be controllably defined to provide an angle of orientation 206, an internal diameter 210 as well as the configuration of the shape and dimensions of the port 190. By controlling these as well as other parameters a variety of mixing configurations can be achieved to induce a mixing energy in the combination of water and at least one sweetener ingredient. Additionally, mixing occurs outside of the apparatus and as such provides the additional sanitation and reliability benefits as noted above.

The ports 190 can be configured to provide a coherent stream as well as a shaped stream. In this regard, the stream can be coherent such as a point or a line stream or a fan stream, cross stream, multipoint stream or other configurations. Depending on the ingredients being mixed with the water alternate streams may be preferred. Applicant intends for all variations of streams to be included with in the range of possible stream configurations that can be used with the present system. Also, if multiple water streams are used they can be directed to converge with the sweetening stream at generally the same point of intersection with the sweetener stream or they can be configured to intersect the sweetening stream at different points along the stream. Intersection or impingement of the sweetener stream at different locations along the sweetener stream path may provide more interaction with some ingredients, or different performance by adding water incrementally to the stream. Regardless of the particular configuration of the water streams and sweetener streams, the entire stream can be brought together 62 for combination with the beverage stream 46.

As shown in the figures, the face portion 184 is configured as a press fit component. Such that the component is pressed into position and retained thereby in interference fit. Alternatively, a retaining feature can be added to the perimeter of the face 184 such as a quarter turn lug and groove configuration. The quarter turn lug and groove configuration can provide simplified tool less attachment and removal of the face when needed.

FIGS. 10A-10F provide diagrammatic illustrations showing various additional timing diagrams. While these timing diagrams are representative, they are not all inclusive. However the diagrams show a variety of additional timing configurations which may be programmed to occur. The reference to "water over tea" means the time during which water is dispensed over the tea. Reference to "tea" is provided as an example and the disclosure is not intended to be limited to tea since the system could be used with any variety of one or more beverage making ingredients or substances as noted herein. The water over tea period defines the period of time during which water is dispensed over the tea ingredient. The "time" is not specifically identified since the timing diagram show relational aspects of the timing. Actual timing and the specific period of time used to dispense water over tea or add ingredients will depend on the specific recipe, ingredients, beverage making substance, and other factors. However, the relational aspects are described herein for purposes of the disclosure.

As shown in FIGS. 10A-10F, there is a start time on the left side of the timing diagram with a stop time on the right side of the timing diagram. The bars or bands represent the period of time during which flow is occurring. While solid bars or bands are shown, it is also possible for intermittent dispensing to occur for any of the ingredients. As an example, water being dispensed over tea may be dispensed in a pulse mode during which water is dispensed in intermittent cycles over the duration of time starting with the start time and stopping with the stop time. Nevertheless, the cycles will start and stop over a period of time. Similar pulsing or regular or irregular dispensing can be programmed to occur with the dilution flow as well as the sweetener and or flavor flow.

Figure 10A:
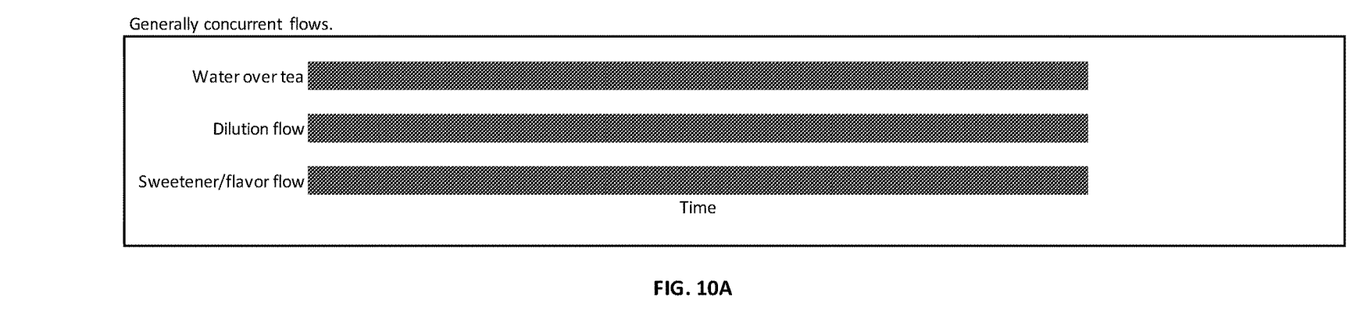
Figure 10B:
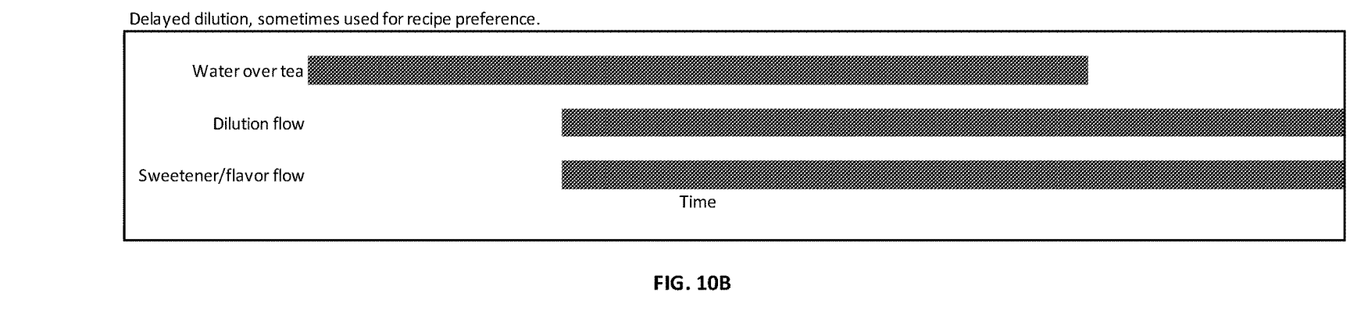
FIG. 10B shows delayed dilution flow as well as delayed sweetener flavor flow which may sometimes be used for recipe preferences.

With regard to FIG. 10B, the dispensing of water over tea and the initiation of tea brewing and dispensing into a container starts before the addition of dilution or bypass water as well as sweetener and flavor. This may be preferred, recommended or dictated by a particular recipe so that the ingredients mix at an appropriate time during the brewing process. The appropriateness of the mixing might be just as a preference for the particular party, or to achieve a desired result. For example, it is possible for some teas to create cloudiness as the result of the addition of ingredients having different or reactive chemical compositions as well as the possibility of temperature differences. These timings can be used to enhance such end result, if preferred, or to minimize or prevent such end results. Nevertheless, FIG. 10B shows the initiation of the brewing process during which water is suspended over the tea and at some point in time stopped. The dilution water flow and sweetener flavor flow occur after the start of dispensing water over the tea and stop after that has occurred. The additional time during which dilution and sweetener continues to flow might correlate to a preferred mixing method or might correlate to the time after which the water stops dispensing over the tea and the beverage runs out of the funnel. In other words, the trailing period of time during which dilution and sweetener continue to flow after the "water" has stopped flowing could correlate to the period of time it takes for the beverage to completely drain or significantly drain from the funnel.

Figure 10C:
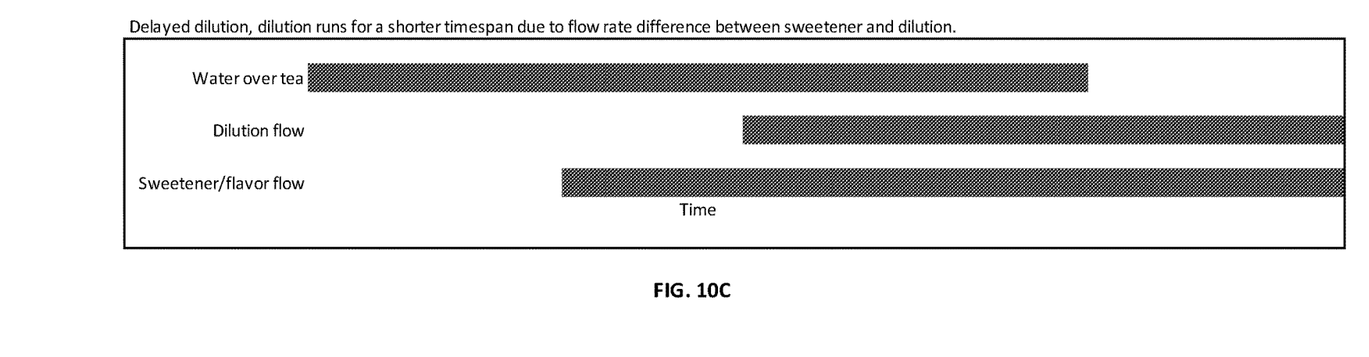
FIG. 10C shows delayed dilution with dilution running for a shorter period of time due to flow rate differences between sweetener and dilution.
Figure 10D:
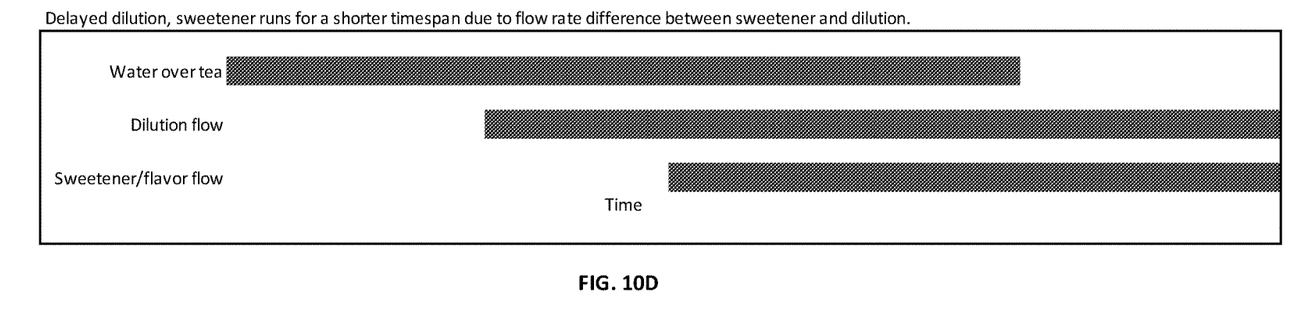
FIG. 10D shows delayed dilution with sweetener running for a shorter period of time due to flow rate differences between sweetener and dilution.

FIG. 10C shows a similar delayed timing as FIG. 10B. FIGS. 10C and 10D are similar in that there is a difference between the sweetener and dilution timing. This could be due to the chemical composition of the materials, temperatures of the materials, or other factors. This can also result of settings being configured on the dispensing equipment which dictate a volume of flow and which might require longer or shorter periods of time for flow to achieve a desired volumetric dispense of ingredient. FIGS. 10C and 10D show a dispensing of dilution and sweetener similar to 10B since they end after the dispensing of "water over tea".

Figure 10E:
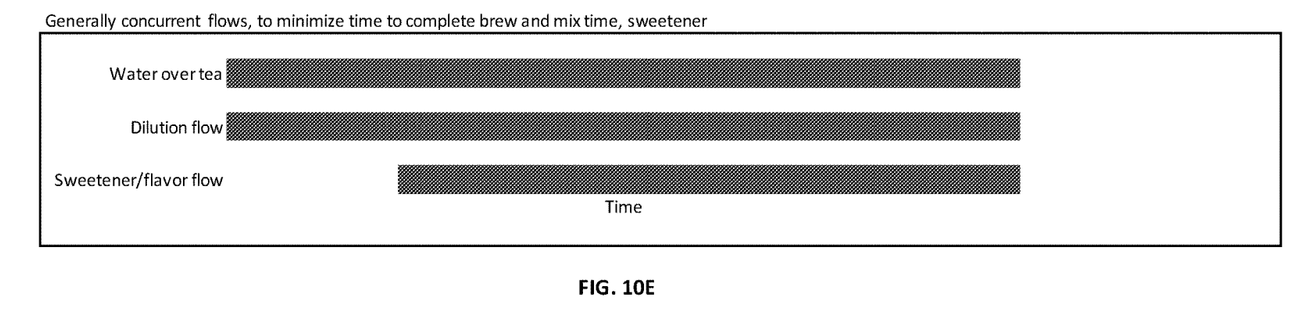
FIG. 10E shows generally concurrent flows which may help to minimize time to complete brew and mix time, sweetener running for a shorter period of time do to flow rate differences between sweetener and dilution.
Figure 10F:
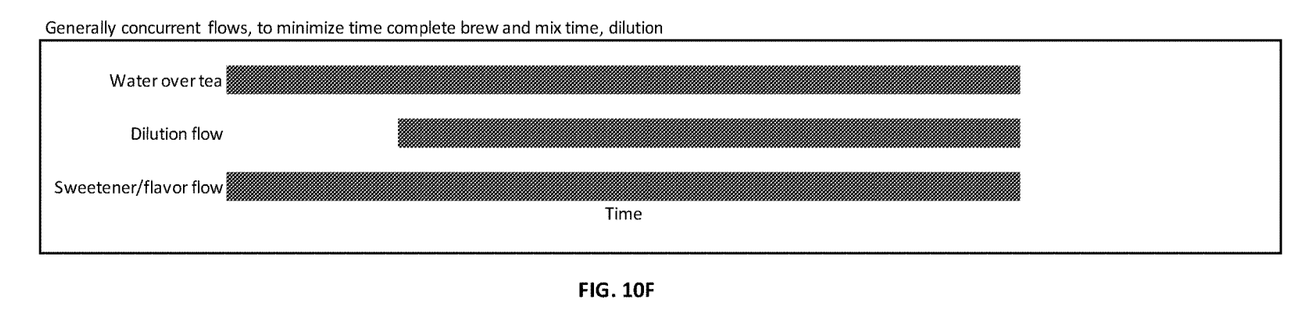
FIG. 10F shows generally concurrent flows to minimize the time to complete the brew and mix cycle with dilution running for a shorter period of time due to flow rate differences between sweetener and dilution.

FIGS. 10E and 10F are similar to FIG. 10A since all of the flows generally cease flowing at the same time. However, FIGS. 10E and 10F are similar to FIGS. 10C and 10D since there are differences between the sweetener and dilution flow rates. Once again, these differences and flow rates may be dictated by the operator, the recipe, the ingredient mixing requirements, as well as results in flavors or other characteristics coming from these mixing strategies. These diagrams, once again, are intended to be an illustration and not a limitation. These diagrams show the variety and flexibility of some of the settings which can be achieved using the system as disclosed which can be used in a variety of beverage making environments.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation so as to encompass all such modifications and equivalent structures and functions.

The invention claimed is:

1. A method for producing a beverage using a beverage making apparatus, the method comprising the steps of:
   providing a controller within a beverage making apparatus housing;
   providing a controllable beverage producing portion operatively coupled to the controller for producing a brewed beverage and dispensing the brewed beverage external to the beverage making apparatus housing, the beverage producing portion including a beverage brewing substance holder for retaining beverage brewing substance used in making the brewed beverage and a drain through which the brewed beverage exits the beverage brewing substance holder;
   providing a dispenser external to the beverage making apparatus housing and positionable below the beverage producing portion for receiving the brewed beverage exiting the drain of the beverage brewing substance holder;
   providing a controllable by-pass water system within the beverage making apparatus housing operatively coupled to the controller for dispensing water into the dispenser for mixing with the brewed beverage therein;
   providing in the controllable by-pass water system a water line internal to the beverage making apparatus housing and communicating with at least one water dispensing port on a dispensing portion for controllably dispensing water from the water line therethrough to a location external to the beverage making apparatus housing;
   providing a liquid sweetener system within the beverage making apparatus housing coupled to the controller for controllably dispensing a liquid sweetener externally of the beverage making apparatus housing and into the dispenser;

providing in the liquid sweetener system a sweetener line internal to the beverage making apparatus housing and communicating with a sweetener dispensing port on the dispensing portion for controllably dispensing the liquid sweetener therethrough externally of the beverage making apparatus housing;

providing the dispensing portion communicating with the controllable by-pass water system and the liquid sweetener system, the dispensing portion extending from the beverage making apparatus housing spaced away from the beverage brewing substance holder to avoid physical contact therewith and including the sweetener dispensing port centrally located on the dispensing portion through which the liquid sweetener is controllably dispensed as a stream external to the beverage making apparatus housing directed into the dispenser;

providing on the dispensing portion at least a pair of water dispensing ports separate from and spaced from the sweetener dispensing port for controllably dispensing water therefrom externally of the beverage making apparatus housing as separate streams of water, the water dispensing ports being configured for producing streams directionally oriented for impinging on the sweetener dispensing stream externally of the beverage making apparatus housing for at least partially mixing with the liquid sweetener externally of the beverage making apparatus housing prior to mixing with the brewed beverage in the dispenser positioned below the beverage brewing substance holder and the dispensing portion to receive the brewed beverage and the combined water and liquid sweetener therein;

controllably dispensing a predetermined volume of liquid sweetener from the dispensing portion;

controllably dispensing a predetermined volume of water from the dispensing portion simultaneously with the dispensing of a separate predetermined volume of the liquid sweetener;

configuring the controller to controllably dispense the predetermined volumes of liquid sweetener and water over at least a portion of the period of time during which the rate at which the total volumes of liquid sweetener and water is controllably dispensed over at least a portion of the total period of time during which the brewed beverage is dispensed from the beverage producing portion for mixing the water, liquid sweetener, and the brewed beverage over a predetermined dispense time.

2. The method for producing the beverage of claim 1, further comprising the steps of:

providing a liquid flavoring system coupled to the controller for controllably dispensing liquid flavor into the dispenser; and configuring the controller to controllably dispense the predetermined volumes of liquid sweetener, water, and flavoring over at least a portion of the period of time during which the rate of the total volumes of liquid sweetener, water, and flavoring is controllably dispensed over at least a portion of the total period of time during which the brewed beverage is dispensed from the beverage producing portion for mixing the water, liquid sweetener, and the brewed beverage over a predetermined dispense time.

3. The method for producing the beverage of claim 1 further comprising directing the flow of at least one mixed ingredient to intersect the flow of the beverage from the beverage making apparatus prior to dispensing into the dispenser at least for a portion of the total period of time during which the brewed beverage is dispensed from the beverage producing portion mixing the water, liquid sweetener, and the brewed beverage over a predetermined dispense time.

* * * * *